United States Patent
Jia

(10) Patent No.: US 10,747,356 B2
(45) Date of Patent: Aug. 18, 2020

(54) TOUCH MODULE, DRIVING METHOD THEREOF AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventor: Peng Jia, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/128,885

(22) Filed: Sep. 12, 2018

(65) Prior Publication Data

US 2019/0294291 A1 Sep. 26, 2019

(30) Foreign Application Priority Data

Mar. 26, 2018 (CN) .......................... 2018 1 0252184

(51) Int. Cl.
*G06F 3/041* (2006.01)

(52) U.S. Cl.
CPC .......... *G06F 3/0416* (2013.01); *G06F 3/0412* (2013.01)

(58) Field of Classification Search
CPC ...... G06F 3/0412; G06F 3/0416; G06F 3/044; G01R 31/58
See application file for complete search history.

(56) References Cited

U.S. PATENT DOCUMENTS

| 2013/0278535 | A1* | 10/2013 | Kim | ...................... G06F 3/0416 345/173 |
| 2014/0132558 | A1* | 5/2014 | Jang | ........................ G06F 3/044 345/174 |
| 2014/0160061 | A1 | 6/2014 | Kim et al. | |
| 2016/0041217 | A1* | 2/2016 | Lee | .......................... G01R 31/58 702/58 |
| 2018/0224971 | A1* | 8/2018 | Lee | .......................... G06F 3/044 |
| 2019/0064956 | A1* | 2/2019 | Tanemura | .............. G06F 3/0416 |
| 2019/0095031 | A1* | 3/2019 | Lee | ........................ G06F 3/0416 |

FOREIGN PATENT DOCUMENTS

CN 103870050 A 6/2014

* cited by examiner

*Primary Examiner* — Richard J Hong

(74) *Attorney, Agent, or Firm* — Brooks Kushman P.C.

(57) ABSTRACT

The present disclosure provides a touch module, a driving method thereof and a display device. The touch module includes a touch electrode layer, a touch region determination unit and a touch position detection unit. The touch electrode layer includes a plurality of touch electrode blocks arranged in an array form and independent of each other, and the plurality of touch electrode blocks is divided into N number of touch regions, where N is an integer greater than 1. The touch region determination unit is configured to determine whether each touch region is being touched, and when there is a touch region which is being touched, transmit a detection control signal to the touch position detection unit. The touch position detection unit is configured to, upon the receipt of the detection control signal, detect a position of a corresponding touch electrode block which is being touched in the touch region which is being touched.

19 Claims, 4 Drawing Sheets

TOUCH MODULE, DRIVING METHOD THEREOF AND DISPLAY DEVICE

CROSS-REFERENCE TO RELATED APPLICATION

This application claims priority to Chinese Patent Application No. 201810252184.9 filed on Mar. 26, 2018, which is incorporated herein by reference in its entirety.

TECHNICAL FIELD

The present disclosure relates to the field of touch technology, in particular to a touch module, a driving method thereof, and a display device.

BACKGROUND

Currently, for an In-Cell touch display panel, a display function and a touch function are driven in a time-division manner. During a touch scanning operation, a signal delay time at a distal end of a driving Integrated Circuit (IC) serves as a minimum scanning time. In addition, during the touch scanning operation, all touch electrode blocks of the display panel are scanned, so a long touch scanning time is required. At this time, for a high-resolution display panel, a display driving time is shortened, and thereby such a phenomenon as undercharge may occur.

SUMMARY

In one aspect, the present disclosure provides in some embodiments a touch module, including a touch electrode layer, a touch region determination unit and a touch position detection unit. The touch electrode layer includes a plurality of touch electrode blocks arranged in an array form and independent of each other, and the plurality of touch electrode blocks is divided into N number of touch regions, where N is an integer greater than 1. The touch region determination unit is configured to determine whether each touch region is being touched, and when there is a touch region which is being touched, transmit a detection control signal to the touch position detection unit. The touch position detection unit is configured to, upon the receipt of the detection control signal, detect a position of a corresponding touch electrode block which is being touched in the touch region which is being touched.

In a possible embodiment of the present disclosure, the touch region determination unit includes a first switching module, N number of primary touch detection ends corresponding to the N number of touch regions respectively, and a touch region determination module. The first switching module is connected to a first control line, the plurality of touch electrode blocks and the N number of primary touch detection ends, and configured to, at a first touch stage, control each primary touch detection end to be electrically connected to all the touch electrode blocks in a corresponding touch region under the control of the first control line. The touch region determination module is connected to the N number of primary touch detection ends, and configured to, at the first touch stage, apply a touch scanning signal to each primary touch detection end, determine whether a corresponding touch region is being touched in accordance with a touch sensing signal from the primary touch detection end, and when there is the touch region which is being touched, transmit the detection control signal to the touch position detection unit.

In a possible embodiment of the present disclosure, the touch position detection unit includes a detection control module, a second switching module, a plurality of secondary touch detection ends corresponding to the plurality of touch electrode blocks respectively, and a touch position detection module. The detection control module is connected to the touch region determination module, and configured to, upon the receipt of the detection control signal, apply an on-state control signal to a second control line. The second switching module is connected to the second control line, the plurality of touch electrode blocks and the plurality of secondary touch detection ends, and configured to, at a second touch stage, control each touch electrode block to be electrically connected to a corresponding secondary touch detection end under the control of the on-state control signal applied to the second control line. The touch position detection module is connected to the plurality of secondary touch detection ends, and configured to, at the second touch stage, apply the touch scanning signal to the secondary touch detection end corresponding to each touch electrode block in the touch region which is being touched, and determine the position of the touch electrode block which is being touched in accordance with the touch sensing signal from the secondary touch detection end corresponding to the touch electrode block in the touch region which is being touched.

In a possible embodiment of the present disclosure, the first switching module is further configured to, at the second touch stage, control each primary touch detection end to be electrically disconnected from all the touch electrode blocks in the corresponding touch region under the control of the first control line. The second switching module is further configured to, at the first touch stage, control each touch electrode block to be electrically disconnected from the corresponding secondary touch detection end under the control of the second control line. The touch position detection module is further configured to, at the second touch stage, control the secondary touch detection ends corresponding to the touch electrode blocks in the touch regions which are not being touched to be in a floating state or to be grounded, or apply a common electrode voltage to the secondary touch detection ends corresponding to the touch electrode blocks in the touch regions which are not being touched.

In a possible embodiment of the present disclosure, the first switching module includes N number of determination switching sub-modules. An $n^{th}$ determination switching sub-module of the N number of determination switching sub-modules corresponds to an $n^{th}$ touch region of the N number of touch regions. M number of touch electrode blocks are arranged in the $n^{th}$ touch region, where M is a positive integer, and n is a positive integer smaller than or equal to N. The $n^{th}$ determination switching sub-module is connected to the first control line, all the touch electrode blocks in the $n^{th}$ touch region and an $n^{th}$ primary touch detection end of the N number of primary touch detection ends, and configured to control all the touch electrode blocks in the $n^{th}$ touch region to be electrically connected to, or electrically disconnected from, the $n^{th}$ primary touch detection end under the control of the first control line.

In a possible embodiment of the present disclosure, the $n^{th}$ determination switching sub-module includes M number of primary switching transistors, and each primary switching transistor corresponds to one of the touch electrode blocks in the $n^{th}$ touch region. A gate electrode of each primary switching transistor is connected to the first control line, a first electrode of the primary switching transistor is connected to the corresponding touch electrode block, and a second electrode of the primary switching transistor is connected to the $n^{th}$ primary touch detection end.

In a possible embodiment of the present disclosure, the second switching module includes N number of detection switching sub-modules, and an $n^{th}$ detection switching sub-module corresponds to the $n^{th}$ touch region. The $n^{th}$ detection switching sub-module is connected to the second control line, all the touch electrode blocks in the $n^{th}$ touch region, and the secondary touch detection ends corresponding to the touch electrode blocks, and configured to control each touch electrode block in the $n^{th}$ touch region to be electrically connected to, or electrically disconnected from, the secondary touch detection end corresponding to the touch electrode block under the control of the second control line.

In a possible embodiment of the present disclosure, the $n^{th}$ detection switching sub-module includes M number of secondary switching transistors, and each secondary switching transistor corresponds to one of the touch electrode blocks in the $n^{th}$ touch region. A gate electrode of each secondary switching transistor is connected to the second control line, a first electrode of the secondary switching transistor is connected to the corresponding touch electrode block, and a second electrode of the secondary switching transistor is connected to the secondary touch detection end corresponding to the touch electrode block.

In a possible embodiment of the present disclosure, the touch electrode layer is a common electrode layer, and the touch module further includes a common electrode voltage application unit connected to the N number of primary touch detection ends and configured to apply a common electrode voltage to the N number of primary touch detection ends at a display stage. The first switching module is further configured to control each primary touch detection end to be electrically connected to all the touch electrode blocks in the corresponding touch region under the control of the first control line. The second switching module is further configured to control each touch electrode block to be electrically disconnected from the corresponding secondary touch detection end under the control of the second control line.

In a possible embodiment of the present disclosure, the common electrode layer is multiplexed as the touch electrode layer.

In a possible embodiment of the present disclosure, the N number of determination switching sub-modules are arranged at a fan-out region of a display substrate.

In a possible embodiment of the present disclosure, the N number of detection switching sub-modules are arranged at the fan-out region of the display substrate.

In a possible embodiment of the present disclosure, the number of the touch electrode blocks in each touch region is same.

In a possible embodiment of the present disclosure, the number of the touch electrode blocks in each touch region is different.

In another aspect, the present disclosure provides in some embodiments a method for driving the above-mentioned touch module, including: determining, by the touch region determination unit, whether each touch region is being touched, and when there is the touch region which is being touched, applying a detection control signal to the touch position detection unit; and detecting, by the touch position detection unit upon the receipt of the detection control signal, a position of the touch electrode block which is being touched in the touch region which is being touched.

In a possible embodiment of the present disclosure, the touch region determination unit includes a first switching module, N number of primary touch detection ends corresponding to the N number of touch regions respectively, and a touch region determination module. The determining, by the touch region determination unit, whether each touch region is being touched, and when there is the touch region which is being touched, applying the detection control signal to the touch position detection unit includes: at a first touch stage, controlling, by the first switching module, each primary touch detection end to be electrically connected to all the touch electrode blocks in a corresponding touch region under the control of a first control line; and applying, by the touch region determination module, a touch scanning signal to each primary touch detection end, determining whether a corresponding touch region is being touched in accordance with a touch sensing signal from the primary touch detection end, and when there is the touch region which is being touched, transmitting the detection control signal to the touch position detection unit.

In a possible embodiment of the present disclosure, the touch position detection unit includes a detection control module connected to the touch region determination module, a second switching module, a plurality of secondary touch detection ends corresponding to the plurality of touch electrode blocks respectively, and a touch position detection module. The detecting, by the touch position detection unit upon the receipt of the detection control signal, the position of the touch electrode block which is being touched in the touch region which is being touched includes: at a second touch stage, applying, by the detection control module upon the receipt of the detection control signal, an on-state control signal to the second control line; controlling, by the second switching module, each touch electrode block to be electrically connected to a corresponding secondary touch detection end under the control of the on-state control signal applied to the second control line; and applying, by the touch position detection module, the touch scanning signal to the secondary touch detection end corresponding to each touch electrode block in the touch region which is being touched, and determining the position of the touch electrode block which is being touched in accordance with the touch sensing signal from the secondary touch detection end corresponding to the touch electrode block in the touch region which is being touched.

In a possible embodiment of the present disclosure, the method further includes, at the second touch stage, controlling, by the touch position detection module, the secondary touch detection ends corresponding to the touch electrode blocks in the touch regions which are not being touched to be in a floating state or to be grounded, or applying a common electrode voltage to the secondary touch detection ends corresponding to the touch electrode blocks in the touch regions which are not being touched.

In a possible embodiment of the present disclosure, the touch electrode layer is a common electrode layer, and the touch module further includes a common electrode voltage application unit. The method further includes: applying, by the common electrode voltage application unit, the common electrode voltage to the N number of primary touch detection ends at a display stage; controlling, by the first switching module, each primary touch detection end to be electrically connected to all the touch electrode blocks in the corresponding touch region under the control of the first control line; and controlling, by the second switching module, each touch electrode block to be electrically disconnected from the corresponding secondary touch detection end under the control of the second control line.

In yet another aspect, the present disclosure provides in some embodiments a display device including the above-mentioned touch module.

BRIEF DESCRIPTION OF THE DRAWINGS

The above and/or additional aspects and advantages of the present disclosure will become apparent and readily understood from the following description of the embodiments made in conjunction with the accompanying drawings, in which.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Transistors adopted in the embodiments of the present disclosure may be thin film transistors (TFTs), field effect transistors (FETs) or any other elements having same characteristics. In the embodiments of the present disclosure, in order to differentiate two electrodes other than a gate electrode from each other, one electrode of each transistor may be called as a first electrode, and the other electrode may be called as a second electrode. In actual use, the first electrode may be a drain electrode while the second electrode may be a source electrode, or the first electrode may be a source electrode while the second electrode may be a drain electrode.

Figure 1:
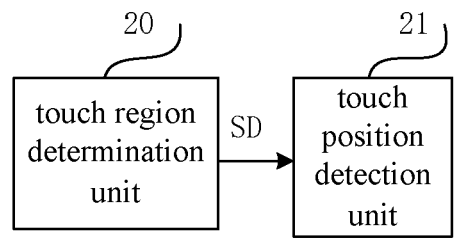
FIG. 1 is a block diagram of a touch module including a touch region determination unit and a touch position detection unit according to one embodiment of the present disclosure.

The present disclosure provides in some embodiments a touch module which, as shown in FIG. 1, includes a touch electrode layer (not shown), a touch region determination unit 20 and a touch position detection unit 21.

The touch electrode layer (not shown in FIG. 1) includes a plurality of touch electrode blocks arranged in an array form and independent of each other, and the plurality of touch electrode blocks is divided into N number of touch regions, where N is an integer greater than 1.

The touch region determination unit 20 is configured to determine whether each touch region is being touched, and when there is a touch region which is being touched, transmit a detection control signal SD to the touch position detection unit 21.

The touch position detection unit 21 is configured to, upon the receipt of the detection control signal SD, detect a position of a corresponding touch electrode block which is being touched in the touch region which is being touched.

According to the touch module in the embodiments of the present disclosure, the touch region may be determined by the touch region determination unit 20 approximately, and then a touch scanning operation may be performed by the touch position detection unit 21 merely on the touch region which is being touched. As a result, it is able to reduce a touch time.

In actual use, the touch electrode layer may be divided into the N number of touch regions in various ways. For example, each touch region may include at least two adjacent rows of touch electrode blocks, or at least two adjacent columns of touch electrode blocks, or at least two columns of touch electrode blocks at a left side of two adjacent rows of touch electrode blocks. The division methods listed above are for illustrative purposes only, and during the implementation, any other division method may also be adopted.

During the implementation, the touch region determination unit may include a first switching module, N number of primary touch detection ends corresponding to the N number of touch regions respectively, and a touch region determination module.

The first switching module is connected to a first control line, the plurality of touch electrode blocks and the N number of primary touch detection ends, and configured to, at a first touch stage, control each primary touch detection end to be electrically connected to all the touch electrode blocks in a corresponding touch region under the control of the first control line.

The touch region determination module is connected to the N number of primary touch detection ends, and configured to, at the first touch stage, apply a touch scanning signal to each primary touch detection end, determine whether a corresponding touch region is being touched in accordance with a touch sensing signal from the primary touch detection end, and when there is the touch region which is being touched, transmit the detection control signal to the touch position detection unit 21.

In actual use, the touch region determination unit 20 may include the first switching module, the N number of primary touch detection ends and the touch region determination module. Each primary touch detection end corresponds to one of the touch regions. The first switching module may, at the first touch stage, control each primary touch detection end to be electrically connected to all the touch electrode blocks in the corresponding touch region. The touch region determination module may, at the first touch stage, apply the touch scanning signal to each primary touch detection end, determine whether the corresponding touch region is being touched in accordance with the touch sensing signal from the primary touch detection end, and when there is the touch region which is being touched, transmit the detection touch signal to the touch position detection unit 21 for a subsequent second detection stage. At the second detection stage, the touch position detection unit 21 may detect the specific touch position in the touch region which is being touched.

The touch region determination unit 20 will be described hereinafter by taking N=3 as an example.

Figure 2:
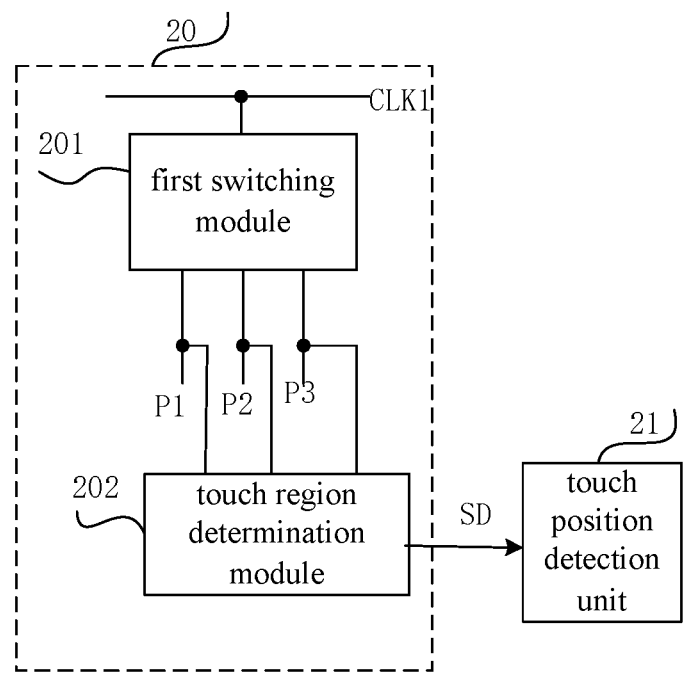
FIG. 2 is another block diagram of the touch module including the touch region determination unit and the touch position detection unit according to one embodiment of the present disclosure.

As shown in FIG. 2, on the basis of the structure shown in FIG. 1, the touch region determination unit 20 includes a first switching module 201, a first primary touch detection end P1, a second primary touch detection end P2, a third primary touch detection end P3, and a touch region determination module 202.

The touch electrode layer (not shown in FIG. 2) includes the plurality of touch electrode blocks arranged in an array form and independent of each other, and the touch electrode layer is divided into a first touch region, a second touch region and a third touch region.

The first touch region (not shown in FIG. 2) corresponds to the first primary touch detection end P1, the second touch region (not shown in FIG. 2) corresponds to the second primary touch detection end P2, and the third touch region (not shown in FIG. 2) corresponds to the third primary touch detection end P3.

The first switching module 201 is connected to a first control line Ctrl1, the plurality of the touch electrode blocks (not shown in FIG. 2), the first primary touch detection end P1, the second primary touch detection end P2 and the third primary touch detection end P3, and configured to, under the control of the first control line Ctrl1 at the first touch stage, control the first primary touch detection end P1 to be electrically connected to all the touch electrode blocks in the first touch region, control the second primary touch detection end P2 to be electrically connected to all the touch electrode blocks in the second touch region, and control the third primary touch detection end P3 to be electrically connected to all the touch electrode blocks in the third touch region.

The touch region determination module 202 is connected to the first primary touch detection end P1, the second primary touch detection end P2 and the third primary touch detection end P3, and configured to, at the first touch stage, apply a touch scanning signal to the first primary touch detection end P1, the second primary touch detection end P2 and the third primary touch detection end P3, determine whether the first touch region is being touched in accordance with a touch sensing signal from the first primary touch detection end P1, determine whether the second touch region is being touched in accordance with a touch sensing signal from the second primary touch detection end P2, determine whether the third touch region is being touched in accordance with a touch sensing signal from the third primary touch detection end P3, and when there is the touch region which is being touched, transmit the detection control signal SD to the touch position detection unit 21.

Figure 3:
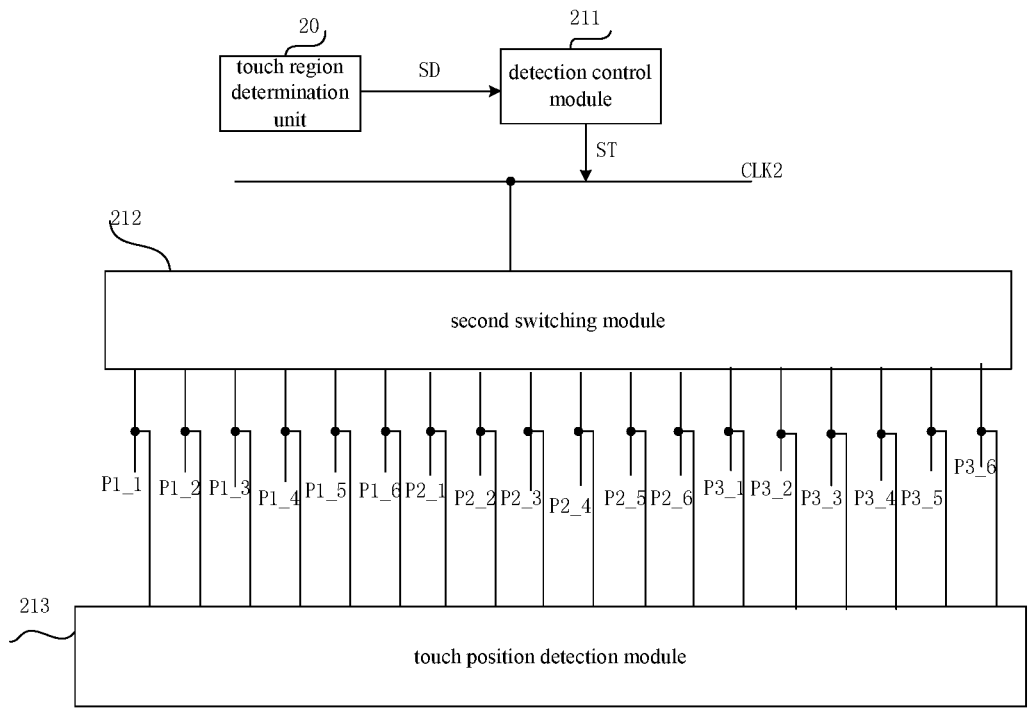
FIG. 3 is a yet another block diagram of the touch module including the touch region determination unit and the touch position detection unit according to one embodiment of the present disclosure.

To be specific, as shown in FIG. 3, the touch position detection unit 21 may include a detection control module 211, a second switching module 212, a plurality of secondary touch detection ends corresponding to the plurality of touch electrode blocks respectively, and a touch position detection module 213.

The detection control module 211 is connected to the touch region determination module, and configured to, upon the receipt of the detection control signal, apply an on-state control signal to a second control line.

The second switching module 212 is connected to the second control line, the plurality of touch electrode blocks and the plurality of secondary touch detection ends, and configured to, at a second touch stage, control each touch electrode block to be electrically connected to a corresponding secondary touch detection end under the control of the on-state control signal applied to the second control line.

The touch position detection module 213 is connected to the plurality of secondary touch detection ends, and configured to, at the second touch stage, apply the touch scanning signal to the secondary touch detection end corresponding to each touch electrode block in the touch region which is being touched, and determine the position of the touch electrode block which is being touched in accordance with the touch sensing signal from the secondary touch detection end corresponding to the touch electrode block in the touch region which is being touched.

In actual use, the touch position detection unit 21 may include the detection control module 211, the second switching module 212, the plurality of secondary touch detection ends corresponding to the plurality of touch electrode blocks respectively, and the touch position detection module 213. The detection control module 211 may, upon the receipt of the detection control signal from the touch region determination module, transmit the on-state control signal to the second control line. The second switching module 212 may, at the second touch stage, control each touch electrode block to be electrically connected to the corresponding secondary touch detection end under the control of the on-state control signal. Then, the touch position detection module may apply the touch scanning signal to the secondary touch detection end corresponding to each touch electrode block in the touch region which is being touched, and determine the position of the touch electrode block which is being touched, i.e., the specific touch position, in accordance with the touch sensing signal from the secondary touch detection end corresponding to the touch electrode block in the touch region which is being touched.

The following description will be given when the touch position detection unit 21 includes 18 secondary touch detection ends. These 18 secondary touch detection ends include a first secondary touch detection end P1_1 corresponding to a first touch electrode block in the first touch region, a second secondary touch detection end P1_2 corresponding to a second touch electrode block in the first touch region, a third secondary touch detection end P1_3 corresponding to a third touch electrode block in the first touch region, a fourth secondary touch detection end P1_4 corresponding to a fourth touch electrode block in the first touch region, a fifth secondary touch detection end P1_5 corresponding to a fifth touch electrode block in the first touch region, a sixth secondary touch detection end P1_6 corresponding to a sixth touch electrode block in the first touch region, a seventh secondary touch detection end P2_1 corresponding to a first touch electrode block in the second touch region, an eighth secondary touch detection end P2_2 corresponding to a second touch electrode block in the second touch region, a ninth secondary touch detection end P2_3 corresponding to a third touch electrode block in the second touch region, a tenth secondary touch detection end P2_4 corresponding to a fourth touch electrode block in the second touch region, an eleventh secondary touch detection end P2_5 corresponding to a fifth touch electrode block in the second touch region, a twelfth secondary touch detection end P2_6 corresponding to a sixth touch electrode block in the second touch region, a thirteenth secondary touch detection end P3_1 corresponding to a first touch electrode block in the third touch region, a fourteenth secondary touch detection end P3_2 corresponding to a second touch electrode block in the third touch region, a fifteenth secondary touch detection end P3_3 corresponding to a third touch electrode block in the third touch region, a sixteenth secondary touch detection end P3_4 corresponding to a fourth touch electrode block in the third touch region, a seventeenth secondary touch detection end P3_5 corresponding to a fifth touch electrode block in the third touch region, and an eighteenth secondary touch detection end P3_6 corresponding to a sixth touch electrode block in the third touch region. It is assumed that, the touch region determination module 202 determines at the first touch stage that the second touch region is being touched.

As shown in FIG. 3, on the basis of the structure in FIG. 1, the touch position detection unit 21 includes the detection control module 211, the second switching module 212, the P1_1, the P1_2, the P1_3, the P1_4, the P1_5, the P1_6, the P2_1, the P2_2, the P2_3, the P2_4, the P2_5, the P2_6, the P3_1, the P3_2, the P3_3, the P3_4, the P3_5, the P3_6, and the touch position detection module 213. The plurality of touch electrode blocks correspond to the plurality of secondary touch detection ends respectively.

The detection control module 211 is connected to the touch region determination module 202, and configured to, upon the receipt of the detection control signal SD, transmit an on-state control signal ST to a second control line Ctrl2.

The second switching module 212 is connected to the second control line Ctrl2, the plurality of touch electrode blocks (not shown in FIG. 3), the P1_1, the P1_2, the P1_3, the P1_4, the P1_5, the P1_6, the P2_1, the P2_2, the P2_3, the P2_4, the P2_5, the P2_6, the P3_1, the P3_2, the P3_3, the P3_4, the P3_5 and the P3_6, and configured to, under the control of the on-state control signal ST applied to the second control line Ctrl2 at the second touch stage, control the P1_1 to be electrically connected to the first touch electrode block in the first touch region, control the P1_2 to be electrically connected to the second touch electrode block in the first touch region, control the P1_3 to be electrically connected to the third touch electrode block in the first touch region, control the P1_4 to be electrically connected to the fourth touch electrode block in the first touch region, control the P1_5 to be electrically connected to the fifth touch electrode block in the first touch region, control the P1_6 to be electrically connected to the sixth touch electrode block in the first touch region, control the P2_1 to be electrically connected to the first touch electrode block in the second touch region, control the P2_2 to be electrically connected to the second touch electrode block in the second touch region, control the P2_3 to be electrically connected to the third touch electrode block in the second touch region, control the P2_4 to be electrically connected to the fourth touch electrode block in the second touch region, control the P2_5 to be electrically connected to the fifth touch electrode block in the second touch region, control the P2_6 to be electrically connected to the sixth touch electrode block in the second touch region, control the P3_1 to be electrically connected to the first touch electrode block in the third touch region, control the P3_2 to be electrically connected to the second touch electrode block in the third touch region, control the P3_3 to be electrically connected to the third touch electrode block in the third touch region, control the P3_4 to be electrically connected to the fourth touch electrode block in the third touch region, control the P3_5 to be electrically connected to the fifth touch electrode block in the third touch region, and control the P3_6 to be electrically connected to the sixth touch electrode block in the third touch region.

The touch position detection module 213 is connected to the P1_1, the P1_2, the P1_3, the P1_4, the P1_5, the P1_6, the P2_1, the P2_2, the P2_3, the P2_4, the P2_5, the P2_6, the P3_1, the P3_2, the P3_3, the P3_4, the P3_5 and the P3_6, and configured to, at the second touch stage, apply the touch scanning signal to the P2_1, the P2_2, the P2_3, the P2_4, the P2_5 and the P2_6, and determine the position of the touch electrode block which is being touched in the second touch region in accordance with the touch sensing signals from the P2_1, the P2_2, the P2_3, the P2_4, the P2_5 and the P2_6, so as to determine the specific touch position. When the touch position detection module 213 detects that the touch electrode block corresponding to the P2_3 is being touched, the touch position may be determined as a position of the touch electrode block corresponding to the P2_3.

During the implementation, the first switching module is further configured to, at the second touch stage, control each primary touch detection end to be electrically disconnected from all the touch electrode blocks in the corresponding touch region under the control of the first control line.

The second switching module is further configured to, at the first touch stage, control each touch electrode block to be electrically disconnected from the corresponding secondary touch detection end under the control of the second control line.

The touch position detection module is further configured to, at the second touch stage, control the secondary touch detection ends corresponding to the touch electrode blocks in the touch regions which are not being touched to be in a floating state or to be grounded, or apply a common electrode voltage to the secondary touch detection ends corresponding to the touch electrode blocks in the touch regions which are not being touched, so as to prevent a touch operation from being adversely affected.

During the operation of the touch module in the embodiments of the present disclosure, each touch period includes at least one touch time period. At the first touch stage within each touch time period, the touch region determination unit 20 may determine whether there is a touch region which is being touched, and when there is the touch region which is being touched, transmit the detection control signal to the touch position detection unit 21 for the second touch stage. At the second touch stage within each touch time period, the touch position detection unit 21 may detect the position of the touch electrode block which is being touched in accordance with the touch sensing signal from the secondary touch detection end corresponding to the touch electrode block in the touch region which is being touched.

Through the above-mentioned touch scanning mode, the touch regions may be scanned at first. When there is the touch region which is being touched, this touch region may be scanned again so as to determine coordinates of the touch position, and when there is no touch region which is being touched, no further scanning operation may be performed. In this way, it is able to reduce the touch time and improve the touch scanning efficiency. In addition, when there is the touch region which is being touched and a touch point is located at a distal region to a driving IC (i.e., a display region far away from the driving IC), the touch time may be relatively long due to signal delay. When the touch point is located at a proximal region to the driving IC (i.e., a display region close to the driving IC), the touch time may be reduced. As compared with a conventional touch scanning mode where a time desired for scanning the distal region to the driving IC is taken as the touch scanning time, it is able to reduce the touch scanning time.

To be specific, the first switching module may include N number of determination switching sub-modules. An $n^{th}$ determination switching sub-module of the N number of determination switching sub-modules corresponds to an $n^{th}$ touch region of the N number of touch regions. M number of touch electrode blocks are arranged in the $n^{th}$ touch region, where M is a positive integer, and n is a positive integer smaller than or equal to N. The $n^{th}$ determination switching sub-module is connected to the first control line, all the touch electrode blocks in the $n^{th}$ touch region and an $n^{th}$ primary touch detection end of the N number of primary touch detection ends, and configured to control all the touch electrode blocks in the $n^{th}$ touch region to be electrically connected to, or electrically disconnected from, the $n^{th}$ primary touch detection end under the control of the first control line.

To be specific, the $n^{th}$ determination switching sub-module may include M number of primary switching transistors, and each primary switching transistor may correspond to one of the touch electrode blocks in the $n^{th}$ touch region. A gate electrode of each primary switching transistor is connected to the first control line, a first electrode of the primary switching transistor is connected to the corresponding touch electrode block, and a second electrode of the primary switching transistor is connected to the $n^{th}$ primary touch detection end.

To be specific, the second switching module may include N number of detection switching sub-modules, and an $n^{th}$ detection switching sub-module may correspond to the $n^{th}$ touch region. The $n^{th}$ detection switching sub-module is connected to the second control line, all the touch electrode blocks in the $n^{th}$ touch region, and the secondary touch detection ends corresponding to the touch electrode blocks, and configured to control each touch electrode block in the $n^{th}$ touch region to be electrically connected to, or electrically disconnected from, the secondary touch detection end corresponding to the touch electrode block under the control of the second control line.

To be specific, the $n^{th}$ detection switching sub-module may include M number of secondary switching transistors, and each secondary switching transistor may correspond to one of the touch electrode blocks in the $n^{th}$ touch region. A gate electrode of each secondary switching transistor is connected to the second control line, a first electrode of the secondary switching transistor is connected to the corresponding touch electrode block, and a second electrode of the secondary switching transistor is connected to the secondary touch detection end corresponding to the touch electrode block.

In actual use, the touch electrode layer may be a common electrode layer, and the touch module may further include a common electrode voltage application unit connected to the N number of primary touch detection ends and configured to apply a common electrode voltage to the N number of primary touch detection ends at a display stage.

The first switching module is further configured to control each primary touch detection end to be electrically connected to all the touch electrode blocks in the corresponding touch region under the control of the first control line.

The second switching module is further configured to control each touch electrode block to be electrically disconnected from the corresponding secondary touch detection end under the control of the second control line.

In a possible embodiment of the present disclosure, the touch electrode layer may be the common electrode layer, and in some cases, the common electrode layer may be multiplexed as the touch electrode layer.

When the common electrode layer is multiplexed as the touch electrode layer, the touch module in the embodiments of the present disclosure may further include the common electrode voltage application unit connected to the N number of primary touch detection ends and configured to apply the common electrode voltage to the N number of primary touch detection ends at the display stage (at the display stage, the first switching module may control each primary touch detection end to be electrically connected to all the touch electrode blocks in the corresponding touch region), so as not to achieve normal display.

The touch module will be described hereinafter by taking N=3 as an example.

Figure 4:
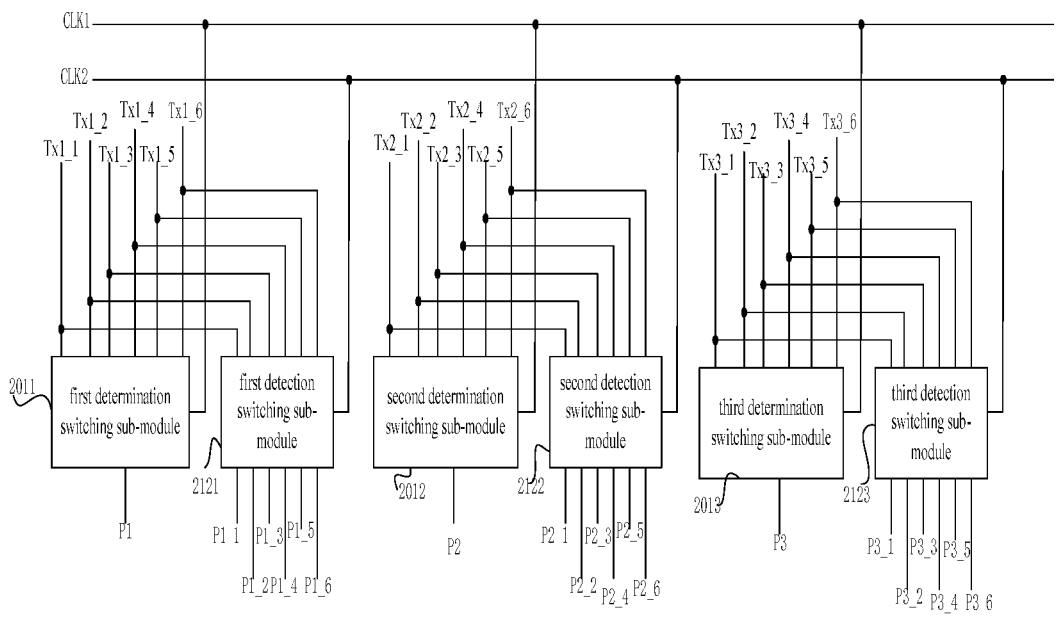
FIG. 4 is a schematic view showing the touch module according to one embodiment of the present disclosure.

As shown in FIG. 4, the touch module includes the touch electrode layer (not shown in FIG. 4) arranged on a display substrate, the touch region determination unit and the touch position detection unit.

The touch region determination unit includes the first switching module, the first primary touch detection end P1, the second primary touch detection end P2, the third primary touch detection end P3 and the touch region determination module (not shown in FIG. 4).

The touch position detection unit includes the detection control module 211, the second switching module, the P1_1, the P1_2, the P1_3, the P1_4, the P1_5, the P1_6, the P2_1, the P2_2, the P2_3, the P2_4, the P2_5, the P2_6, the P3_1, the P3_2, the P3_3, the P3_4, the P3_5, the P3_6, and the touch position detection module (not shown in FIG. 4). The plurality of touch electrode blocks corresponds to the plurality of secondary touch detection ends respectively.

The touch electrode layer includes the touch electrode blocks arranged in an array form and independent of each other, and the touch electrode blocks are divided into the first touch region, the second touch region and the third touch region. Six touch electrode blocks are arranged in each of the first touch region, the second touch region and the third touch region.

As shown in FIG. 4, a first touch electrode block in the first touch region is Tx1_1, a second touch electrode block in the first touch region is Tx1_2, a third touch electrode block in the first touch region is Tx1_3, a fourth touch electrode block in the first touch region is Tx1_4, a fifth touch electrode block in the first touch region is Tx1_5, and a sixth touch electrode block in the first touch region is Tx1_6.

Identically, as shown in FIG. 4, a first touch electrode block in the second touch region is Tx2_1, a second touch electrode block in the second touch region is Tx2_2, a third touch electrode block in the second touch region is Tx2_3, a fourth touch electrode block in the second touch region is Tx2_4, a fifth touch electrode block in the second touch region is Tx2_5, and a sixth touch electrode block in the second touch region is Tx2_6.

Identically, as shown in FIG. 4, a first touch electrode block in the third touch region is Tx3_1, a second touch electrode block in the third touch region is Tx3_2, a third touch electrode block in the third touch region is Tx3_3, a fourth touch electrode block in the third touch region is Tx3_4, a fifth touch electrode block in the third touch region is Tx3_5, and a sixth touch electrode block in the third touch region is Tx3_6.

The first switching module 201 includes a first determination switching sub-module 2011 corresponding to the first touch region, a second determination switching sub-module 2012 corresponding to the second touch region, and a third determination switching sub-module 2013 corresponding to the third touch region. The second switching module 212 includes a first detection switching sub-module 2121 corresponding to the first touch region, a second detection switching sub-module 2122 corresponding to the second touch region, and a third detection switching sub-module 2123 corresponding to the third touch region.

The first determination switching sub-module 2011 is connected to the first primary touch detection end P1, a first control line CLK1, and the Tx1_1, the Tx1_2, the Tx1_3, the Tx1_4, the Tx1_5 and the Tx1_6 in the first touch region, and configured to, under the control of the first control line CLK1, control the Tx1_1 to be electrically connected to, or electrically disconnected from, the first primary touch detection end P1, control the Tx1_2 to be electrically connected to, or electrically disconnected from, the first primary touch detection end P1, control the Tx1_3 to be electrically connected to, or electrically disconnected from, the first primary touch detection end P1, control the Tx1_4 to be electrically connected to, or electrically disconnected from, the first primary touch detection end P1, control the Tx1_5 to be electrically connected to, or electrically disconnected from, the first primary touch detection end P1, and control the Tx1_6 to be electrically connected to, or electrically disconnected from, the first primary touch detection end P1.

The second determination switching sub-module 2012 is connected to the second primary touch detection end P2, the first control line CLK1, and the Tx2_1, the Tx2_2, the Tx2_3, the Tx2_4, the Tx2_5 and the Tx2_6 in the second touch region, and configured to, under the control of the first control line CLK1, control the Tx2_1 to be electrically connected to, or electrically disconnected from, the second primary touch detection end P2, control the Tx2_2 to be electrically connected to, or electrically disconnected from, the second primary touch detection end P2, control the Tx2_3 to be electrically connected to, or electrically disconnected from, the second primary touch detection end P2, control the Tx2_4 to be electrically connected to, or electrically disconnected from, the second primary touch detection end P2, control the Tx2_5 to be electrically connected to, or electrically disconnected from, the second primary touch detection end P2, and control the Tx2_6 to be electrically connected to, or electrically disconnected from, the second primary touch detection end P2.

The third determination switching sub-module 2013 is connected to the third primary touch detection end P3, the first control line CLK1, and the Tx3_1, the Tx3_2, the Tx3_3, the Tx3_4, the Tx3_5 and the Tx3_6 in the third touch region, and configured to, under the control of the first control line CLK1, control the Tx3_1 to be electrically connected to, or electrically disconnected from, the third primary touch detection end P3, control the Tx3_2 to be electrically connected to, or electrically disconnected from, the third primary touch detection end P3, control the Tx3_3 to be electrically connected to, or electrically disconnected from, the third primary touch detection end P3, control the Tx3_4 to be electrically connected to, or electrically disconnected from, the third primary touch detection end P3, control the Tx3_5 to be electrically connected to, or electrically disconnected from, the third primary touch detection end P3, and control the Tx3_6 to be electrically connected to, or electrically disconnected from, the third primary touch detection end P3.

The first detection switching sub-module 2121 is connected to a second control line CLK2, the Tx1_1, the Tx1_2, the Tx1_3, the Tx1_4, the Tx1_5 and the Tx1_6 in the first touch region, the P1_1, the P1_2, the P1_3, the P1_4, the P1_5, and the P1_6, and configured to, under the control of the second control line CLK2, control the Tx1_1 to be electrically connected to, or electrically disconnected from, the P1_1, control the Tx1_2 to be electrically connected to, or electrically disconnected from, the P1_2, control the Tx1_3 to be electrically connected to, or electrically disconnected from, the P1_3, control the Tx1_4 to be electrically connected to, or electrically disconnected from, the P1_4, control the Tx1_5 to be electrically connected to, or electrically disconnected from, the P1_5, and control the Tx1_6 to be electrically connected to, or electrically disconnected from, the P1_6.

The second detection switching sub-module 2122 is connected to the second control line CLK2, the Tx2_1, the Tx2_2, the Tx2_3, the Tx2_4, the Tx2_5 and the Tx2_6 in the second touch region, the P2_1, the P2_2, the P2_3, the P2_4, the P2_5, and the P2_6, and configured to, under the control of the second control line CLK2, control the Tx2_1 to be electrically connected to, or electrically disconnected from, the P2_1, control the Tx2_2 to be electrically connected to, or electrically disconnected from, the P2_2, control the Tx2_3 to be electrically connected to, or electrically disconnected from, the P2_3, control the Tx2_4 to be electrically connected to, or electrically disconnected from, the P2_4, control the Tx2_5 to be electrically connected to, or electrically disconnected from, the P2_5, and control the Tx2_6 to be electrically connected to, or electrically disconnected from, the P2_6.

The third detection switching sub-module 2123 is connected to the second control line CLK2, the Tx3_1, the Tx3_2, the Tx3_3, the Tx3_4, the Tx3_5 and the Tx3_6 in the third touch region, the P3_1, the P3_2, the P3_3, the P3_4, the P3_5, and the P3_6, and configured to, under the control of the second control line CLK2, control the Tx3_1 to be electrically connected to, or electrically disconnected from, the P3_1, control the Tx3_2 to be electrically connected to, or electrically disconnected from, the P3_2, control the Tx3_3 to be electrically connected to, or electrically disconnected from, the P3_3, control the Tx3_4 to be electrically connected to, or electrically disconnected from, the P3_4, control the Tx3_5 to be electrically connected to, or electrically disconnected from, the P3_5, and control the Tx3_6 to be electrically connected to, or electrically disconnected from, the P3_6.

For example, in actual use, the first determination switching sub-module 2011, the second determination switching sub-module 2012, the third determination switching sub-module 2013, the first detection switching sub-module 2121, the second detection switching sub-module 2122 and the third detection switching sub-module 2123 may be arranged at a fan-out region of the display substrate.

During the operation of the touch module in FIG. 4, at the first touch stage within each touch time period, the first determination switching sub-module 2011 may, under the control of the first control line CLK1, control each of the Tx1_1, the Tx1_2, the Tx1_3, the Tx1_4, the Tx1_5 and the Tx1_6 to be electrically connected to the P1, transmit the touch scanning signal to the P1, receive the touch sensing signal from the P1, and determine whether each touch electrode block in the first touch region is being touched in accordance with the touch sensing signal. A second control module 1012 of a first control sub-unit 101 may, under the control of the second control line CLK2, control the Tx1_1 to be electrically disconnected from the P1_1, control the Tx1_2 to be electrically disconnected from the P1_2, control the Tx1_3 to be electrically disconnected from the P1_3, control the Tx1_4 to be electrically disconnected from the P1_4, control the Tx1_5 to be electrically disconnected from the P1_5, and control the Tx1_6 to be electrically disconnected from the P1_6.

At the first touch stage, the second determination switching sub-module 2012 may, under the control of the first control line CLK1, control each of the Tx2_1, the Tx2_2, the Tx2_3, the Tx2_4, the Tx2_5 and the Tx2_6 to be electrically connected to the P2, transmit the touch scanning signal to the P2, receive the touch sensing signal from the P2, and determine whether each touch electrode block in the second touch region is being touched in accordance with the touch sensing signal. A second control module 1022 of a second control sub-unit 102 may, under the control of the second control line CLK2, control the Tx2_1 to be electrically disconnected from the P2_1, control the Tx2_2 to be electrically disconnected from the P2_2, control the Tx2_3 to be electrically disconnected from the P2_3, control the Tx2_4 to be electrically disconnected from the P2_4, control the Tx2_5 to be electrically disconnected from the P2_5, and control the Tx2_6 to be electrically disconnected from the P2_6.

At the first touch stage, the third determination switching sub-module 2013 may, under the control of the first control line CLK1, control each of the Tx3_1, the Tx3_2, the Tx3_3, the Tx3_4, the Tx3_5 and the Tx3_6 to be electrically connected to the P3, transmit the touch scanning signal to the P3, receive the touch sensing signal from the P3, and determine whether each touch electrode block in the third touch region is being touched in accordance with the touch sensing signal. A second control module 1032 of a third control sub-unit 103 may, under the control of the second control line CLK2, control the Tx3_1 to be electrically disconnected from the P3_1, control the Tx3_2 to be electrically disconnected from the P3_2, control the Tx3_3 to be electrically disconnected from the P3_3, control the Tx3_4 to be electrically disconnected from the P3_4, control the Tx3_5 to be electrically disconnected from the P3_5, and control the Tx3_6 to be electrically disconnected from the P3_6.

When the touch position detection unit determines, at the first touch stage, that a certain touch electrode position in the second touch region is being touched but the touch electrode blocks in the first and second touch regions are not being touched, it is merely necessary to perform the touch scanning operation on the touch electrode blocks in the second touch region again at the second touch stage.

At the second touch stage, the first determination switching sub-module 2011 may, under the control of the first control line CLK1, control the P1 to be electrically disconnected from each of the Tx1_1, the Tx1_2, the Tx1_3, the Tx1_4, the Tx1_5 and the Tx1_6. The second control module 1012 of the first control sub-unit 101 may, under the control of the second control line CLK2, control the P1_1 to be electrically connected to the Tx1_1, control the P1_2 to be electrically connected to the Tx1_2, control the P1_3 to be electrically connected to the Tx1_3, control the P1_4 to be electrically connected to the Tx1_4, control the P1_5 to be electrically connected to the Tx1_5, and control the P1_6 to be electrically connected to the Tx1_6. At this time, the P1_1, the P1_2, the P1_3, the P1_4, the P1_5 and the P1_6 may be in the floating state or grounded, or the common electrode voltage signal may be applied to the P1_1, the P1_2, the P1_3, the P1_4, the P1_5 and the P1_6, so as to prevent the touch operation from being adversely affected.

At the second stage, the second determination switching sub-module 2012 may, under the control of the first control line CLK1, control the P2 to be electrically disconnected from each of the Tx2_1, the Tx2_2, the Tx2_3, the Tx2_4, the Tx2_5 and the Tx2_6. The second control module 1022 of the second control sub-unit 102 may, under the control of the second control line CLK2, control the P2_1 to be electrically connected to the Tx2_1, control the P2_2 to be electrically connected to the Tx2_2, control the P2_3 to be electrically connected to the Tx2_3, control the P2_4 to be electrically connected to the Tx2_4, control the P2_5 to be electrically connected to the Tx2_5, and control the P2_6 to be electrically connected to the Tx2_6. At this time, the touch scanning signal may be applied to the P2_1, the P2_2, the P2_3, the P2_4, the P2_5 and the P2_6, and the touch electrode block which is being touched may be determined in accordance with the touch sensing signals from the P2_1, the P2_2, the P2_3, the P2_4, the P2_5 and the P2_6, so as to determine the touch position.

At the second touch stage, the third determination switching sub-module 2013 may, under the control of the first control line CLK1, control the P3 to be electrically disconnected from each of the Tx3_1, the Tx3_2, the Tx3_3, the Tx3_4, the Tx3_5 and the Tx3_6. The second control module 1032 of the third control sub-unit 103 may, under the control of the second control line CLK2, control the P3_1 to be electrically connected to the Tx3_1, control the P3_2 to be electrically connected to the Tx3_2, control the P3_3 to be electrically connected to the Tx3_3, control the P3_4 to be electrically connected to the Tx3_4, control the P3_5 to be electrically connected to the Tx3_5, and control the P3_6 to be electrically connected to the Tx3_6. At this time, the P3_1, the P3_2, the P3_3, the P3_4, the P3_5 and the P3_6 may be in the floating state or grounded, or the common electrode voltage signal may be applied to the P3_1, the P3_2, the P3_3, the P3_4, the P3_5 and the P3_6, so as to prevent the touch operation from being adversely affected.

In the embodiment as shown in FIG. 4, N=3 is taken as an example. However, in actual use, the touch electrode layer may be divided into more than three touch regions.

In the embodiment as shown in FIG. 4, each touch region includes six touch electrode blocks. In actual use, the number of the touch electrode blocks in each touch region may be same or different. In addition, the number of the touch electrode blocks in each touch region will not be particularly defined herein.

During the touch operation, all the signals need to be modulated when the corresponding members are grounded, so as to prevent the occurrence of display defects.

Figure 5:
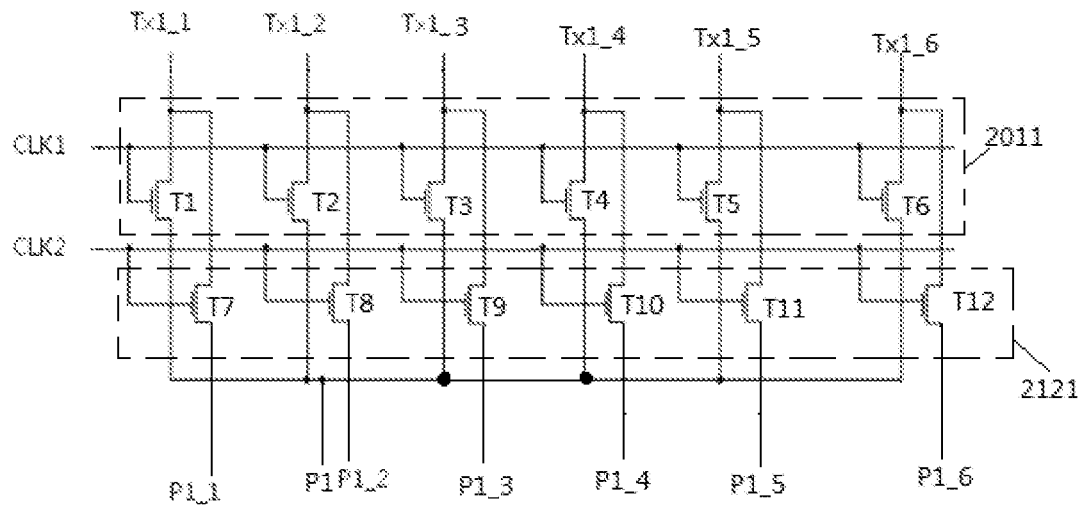
FIG. 5 is a circuit diagram of a first determination switching sub-module 2011 and a first detection switching sub-module 2121 of the touch module in FIG. 4.

As shown in FIG. 5, the first determination switching sub-module 2011 includes a first transistor T1, a second transistor T2, a third transistor T3, a fourth transistor T4, a fifth transistor T5 and a sixth transistor T6. Gate electrodes of the T1, T2, T3, T4, T5 and T6 are connected to the first control line CLK1. A drain electrode of the T1 is connected to the Tx1_1, and a source electrode of the T1 is connected to the P1. A drain electrode of the T2 is connected to the Tx1_2, and a source electrode of the T2 is connected to the P1. A drain electrode of the T3 is connected to the Tx1_3, and a source electrode of the T3 is connected to the P1. A drain electrode of the T4 is connected to the Tx1_4, and a source electrode of the T4 is connected to the P1. A drain electrode of the T5 is connected to the Tx1_5, and a source electrode of the T5 is connected to the P1. A drain electrode of the T6 is connected to the Tx1_6, and a source electrode of the T6 is connected to the P1.

The first detection switching sub-module 2121 includes a seventh transistor T7, an eighth transistor T8, a ninth transistor T9, a tenth transistor T10, an eleventh transistor T11 and a twelfth transistor T12. Gate electrodes of the T7, T8, T9, T10, T11 and T12 are connected to the second control line CLK2. A drain electrode of the T7 is connected to the Tx1_1, and a source electrode of the T7 is connected to the P1_1. A drain electrode of the T8 is connected to the Tx1_2, and a source electrode of the T8 is connected to the P1_2. A drain electrode of the T9 is connected to the Tx1_3, and a source electrode of the T9 is connected to the P1_3. A drain electrode of the T10 is connected to the Tx1_4, and a source electrode of the T10 is connected to the P1_4. A drain electrode of the T11 is connected to the Tx1_5, and a source electrode of the T11 is connected to the P1_5. A drain electrode of the T12 is connected to the Tx1_6, and a source electrode of the T12 is connected to the P1_6.

For the first determination switching sub-module 2011 and the first detection switching sub-module 2121 in FIG. 5, all the transistors are n-type transistors. However, in actual use, the transistors may also be p-type transistors, i.e., the types of the transistors will not be particularly defined herein.

Figure 6:
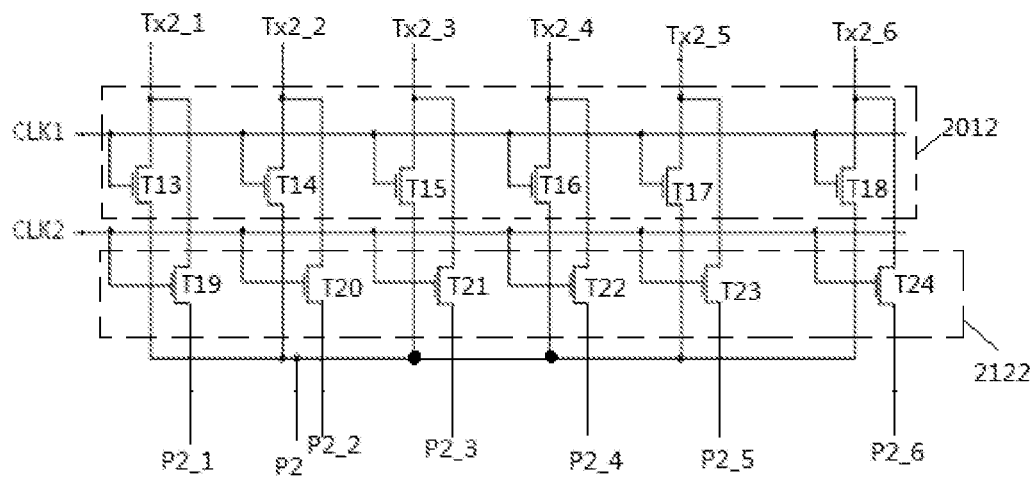
FIG. 6 is a circuit diagram of a second determination switching sub-module 2012 and a second detection switching sub-module 2122 of the touch module in FIG. 4.

As shown in FIG. 6, the second determination switching sub-module 2012 includes a thirteenth transistor T13, a fourteenth transistor T14, a fifteenth transistor T15, a sixteenth transistor T16, a seventeenth transistor T17 and an eighteenth transistor T18. Gate electrodes of the T13, T14, T15, T16, T17 and T18 are connected to the first control line CLK1. A drain electrode of the T13 is connected to the Tx2_1, and a source electrode of the T13 is connected to the P2. A drain electrode of the T14 is connected to the Tx2_2, and a source electrode of the T14 is connected to the P2. A drain electrode of the T15 is connected to the Tx2_3, and a source electrode of the T15 is connected to the P2. A drain electrode of the T16 is connected to the Tx2_4, and a source electrode of the T16 is connected to the P2. A drain electrode of the T17 is connected to the Tx2_5, and a source electrode of the T17 is connected to the P2. A drain electrode of the T18 is connected to the Tx2_6, and a source electrode of the T18 is connected to the P2.

The second detection switching sub-module 2122 includes a nineteenth transistor T19, a twentieth transistor T20, a twenty-first transistor T21, a twenty-second transistor T22, a twenty-third transistor T23, and a twenty-fourth transistor T24. Gate electrodes of the T19, T20, T21, T22, T23 and T24 are connected to the second control line CLK2. A drain electrode of the T19 is connected to the Tx2_1, and a source electrode of the T19 is connected to the P2_1. A drain electrode of the T20 is connected to the Tx2_2, and a source electrode of the T20 is connected to the P2_2. A drain electrode of the T21 is connected to the Tx2_3, and a source electrode of the T21 is connected to the P2_3. A drain electrode of the T22 is connected to the Tx2_4, and a source electrode of the T22 is connected to the P2_4. A drain electrode of the T23 is connected to the Tx2_5, and a source electrode of the T23 is connected to the P2_5. A drain electrode of the T24 is connected to the Tx2_6, and a source electrode of the T24 is connected to the P2_6.

For the second determination switching sub-module 2012 and the second detection switching sub-module 2122 in FIG. 6, all the transistors are n-type transistors. However, in actual use, the transistors may also be p-type transistors, i.e., the types of the transistors will not be particularly defined herein.

Figure 7:
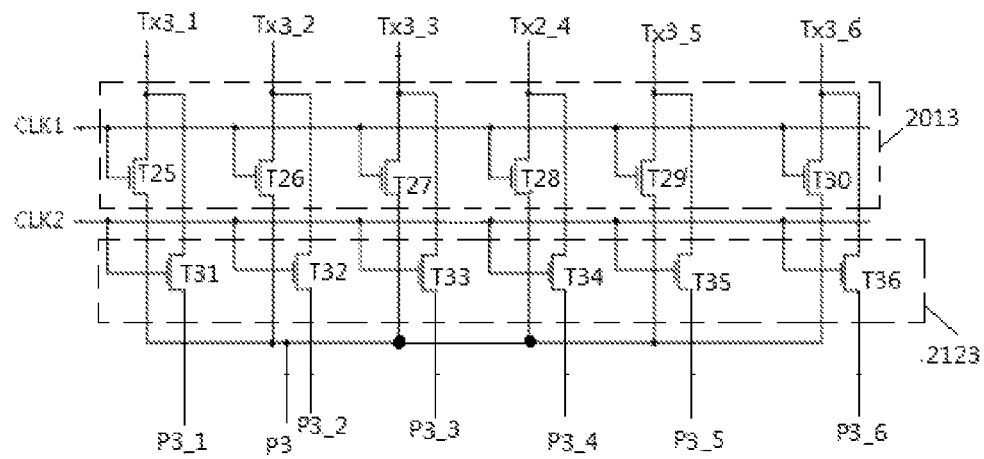
FIG. 7 is a circuit diagram of a third determination switching sub-module 2013 and a third detection switching sub-module 2123 of the touch module in FIG. 4.

As shown in FIG. 7, the third determination switching sub-module 2013 includes a twenty-fifth transistor T25, a twenty-sixth transistor T26, a twenty-seventh transistor T27, a twenty-eighth transistor T28, a twenty-ninth transistor T29 and a thirtieth transistor T30. Gate electrodes of the T25, T26, T27, T28, T29 and T30 are connected to the first control line CLK1. A drain electrode of the T25 is connected to the Tx3_1, and a source electrode of the T25 is connected to the P3. A drain electrode of the T26 is connected to the Tx3_2, and a source electrode of the T26 is connected to the P3. A drain electrode of the T27 is connected to the Tx3_3, and a source electrode of the T27 is connected to the P3. A drain electrode of the T28 is connected to the Tx3_4, and a source electrode of the T28 is connected to the P3. A drain electrode of the T29 is connected to the Tx3_5, and a source electrode of the T29 is connected to the P3. A drain electrode of the T30 is connected to the Tx3_6, and a source electrode of the T30 is connected to the P3.

The third detection switching sub-module 2123 includes a thirty-first transistor T31, a thirty-second transistor T32, a thirty-third transistor T33, a thirty-fourth transistor T34, a thirty-fifth transistor T35 and a thirty-sixth transistor T36. Gate electrodes of the T31, T32, T33, T34, T35 and T36 are connected to the second control line CLK2. A drain electrode of the T31 is connected to the Tx3_1, and a source electrode of the T31 is connected to the P3_1. A drain electrode of the T32 is connected to the Tx3_2, and a source electrode of the T32 is connected to the P3_2. A drain electrode of the T33 is connected to the Tx3_3, and a source electrode of the T33 is connected to the P3_3. A drain electrode of the T34 is connected to the Tx3_4, and a source electrode of the T34 is connected to the P3_4. A drain electrode of the T35 is connected to the Tx3_5, and a source electrode of the T35 is connected to the P3_5. A drain electrode of the T36 is connected to the Tx3_6, and a source electrode of the T36 is connected to the P3_6.

For the third determination switching sub-module 2013 and the third detection switching sub-module 2123 in FIG. 7, all the transistors are n-type transistors. However, in actual use, the transistors may also be p-type transistors, i.e., the types of the transistors will not be particularly defined herein.

In actual use, the touch region determination module and the touch position detection module may be arranged in a touch circuit, and the touch circuit may be arranged in the driving IC. The primary touch detection ends and the secondary touch detection ends may be connected to pins of the driving IC.

During the operation of the touch module in FIG. 4, when the first determination switching sub-module 2011 and the first detection switching sub-module 2121 are of the structures in FIG. 5, the second determination switching sub-module 2012 and the second detection switching sub-module 2122 are of the structures in FIG. 6, and the third determination switching sub-module 2013 and the third detection switching sub-module 2123 are of the structures in FIG. 7, at the first touch stage within the touch time period, the CLK1 may output a high level and the CLK2 may output a low level, so as to turn on the T1, T2, T3, T4, T5 and T6 and thereby to enable each of the Tx1_1, Tx1_2, Tx1_3, Tx1_4, Tx1_5 and Tx1_6 to be electrically connected to the P1, turn on the T13, T14, T15, T16, T17 and T18 thereby to enable each of the Tx2_1, Tx2_2, Tx2_3, Tx2_4, Tx2_5 and Tx2_6 to be electrically connected to the P2, and turn on the T25, T26, T27, T28, T29 and T30 and thereby to enable the Tx3_1, Tx3_2, Tx3_3, Tx3_4, Tx3_5 and Tx3__6 to be electrically connected to the P3. The touch region determination module may transmit the touch scanning signal to the P1, P2 and P3, receive a first touch sensing signal from the P1, a second touch sensing signal from the P2 and a third touch sensing signal form the P3, and determine whether the first touch region is being touched in accordance with the first touch sensing signal, whether the second touch region is being touched in accordance with the second touch sensing signal, and whether the third touch region is being touched in accordance with the third touch sensing signal. When the second touch region is determined as being touched in accordance with the second touch sensing signal but the first and third touch regions are determined as not being touched in accordance with the first and third touch sensing signals, operations at the second touch stage may be performed.

At the first touch stage, the transistors whose gate electrodes are connected to the CLK2 may be turned off.

At the second touch stage within the touch time period, the CLK1 may output a low level and the CLK2 may output a high level, so as to turn off the transistors which have been turned on at the first touch stage, turn on the T7, T8, T9, T10, T11 and T12, thereby to enable the Tx1_1 to be electrically connected to the P1_1, enable the Tx1_2 to be electrically connected to the P1_2, enable the Tx1_3 to be electrically connected to the P1_3, enable the Tx1_4 to be electrically connected to the P1_4, enable the Tx1_5 to be electrically connected to the P1_5 and enable the Tx1_6 to be electrically connected to the P1_6, turn on the T19, T20, T21, T22, T23 and T24, thereby to enable the Tx2_1 to be electrically connected to the P2_1, enable the Tx2_2 to be electrically connected to the P2_2, enable the Tx2_3 to be electrically connected to the P2_3, enable the Tx2_4 to be electrically connected to the P2_4, enable the Tx2_5 to be electrically connected to the P2_5 and enable the Tx2_6 to be electrically connected to the P2_6, and turn on the T31, T32, T33, T34, T35 and T36, thereby to enable the Tx3_1 to be electrically connected to the P3_1, enable the Tx3_2 to be electrically connected to the P3_2, enable the Tx3_3 to be electrically connected to the P3_3, enable the Tx3_4 to be electrically connected to the P3_4, enable the Tx3_5 to be electrically connected to the P3_5 and enable the Tx3_6 to be electrically connected to the P3_6. The touch position detection module may transmit the touch scanning signal to the P2_1, P2_2, P2_3, P2_4, P2_5 and P2_6, receive the touch sensing signals from the P2_1, P2_2, P2_3, P2_4, P2_5 and P2_6, and determine the touch electrode block which is being touched in the second touch region in accordance with the touch sensing signals.

When the touch module in FIG. 4 further includes the common electrode voltage application unit and common electrode blocks are multiplexed as the touch electrode blocks, at the second touch stage, the common electrode voltage application unit may apply a common electrode voltage signal to the P1_1, P1_2, P1_3, P1_4, P1_5, P1_6, P3_1, P3_2, P3_3, P3_4, P3_5 and P3_6.

During the touch operation, all the signals may be modulated when the corresponding members are grounded, so as to prevent the occurrence of the display defects.

At the display stage, the CLK1 may output a high level and the CLK2 may output a low level, so as to turn on the transistors whose gate electrodes are connected to the CLK1, and turn off the transistors whose gate electrodes are connected to the CLK2. The common electrode voltage application unit may apply the common electrode voltage signal to the P1, P2 and P3, so as to apply the common electrode voltage signal to all the touch electrode blocks, thereby to achieve normal display.

Through the above-mentioned touch scanning mode, a touch display panel may be scanned in a region-based manner. When there is the touch region which is being touched, this touch region may be scanned again so as to determine coordinates of the touch position, and when there is no touch region which is being touched, no further scanning operation may be performed. In this way, it is able to reduce the touch time and improve the touch scanning efficiency. In addition, when there is the touch region which is being touched and a touch point is located at a distal region to a driving IC, the touch time may be relatively long due to signal delay. When the touch point is located at a proximal region to the driving IC, the touch time may be reduced. As compared with the conventional touch scanning mode where the time desired for scanning the distal region to the driving IC is taken as the touch scanning time, it is able to further reduce the touch scanning time and improve the touch scanning efficiency.

Figure 8:
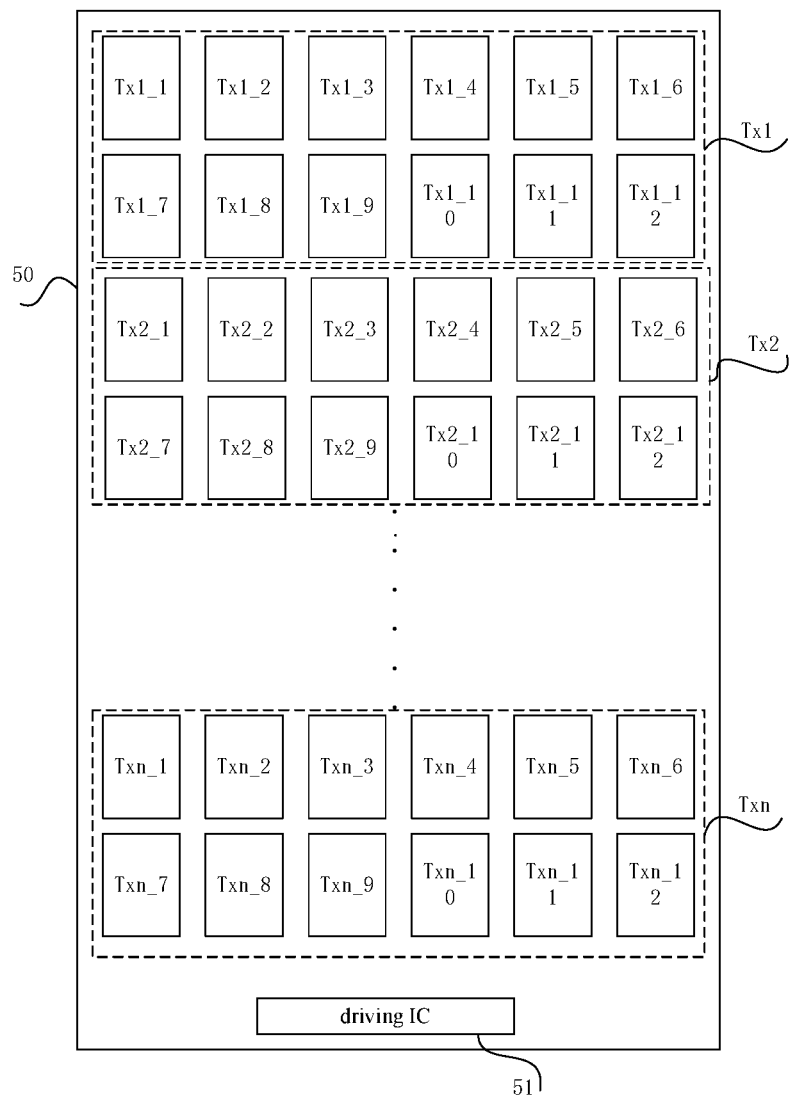
FIG. 8 is a schematic view showing a display substrate and touch electrode blocks of the touch module according to one embodiment of the present disclosure.

As shown in FIG. 8, the touch module includes a display substrate 50 and the touch electrode layer arranged on the display substrate 50. The touch electrode layer includes the plurality of touch electrode blocks arranged in an array form and independent of each other.

In FIG. 8, the plurality of touch electrode blocks is divided into n number of touch regions, where n is an integer greater than 3.

In FIG. 8, Tx1_1 represents a touch electrode block in a first row and a first column, Tx1_2 represents a touch electrode block in the first row and a second column, Tx1_3 represents a touch electrode block in the first row and a third column, Tx1_4 represents a touch electrode block in the first row and a fourth column, Tx1_5 represents a touch electrode block in the first row and a fifth column, Tx1_6 represents a touch electrode block in the first row and a sixth column, Tx1_7 represents a touch electrode block in a second row and the first column, Tx1_8 represents a touch electrode block in the second row and a second column, Tx_1_9 represents a touch electrode block in the second row and a third column, Tx1_10 represents a touch electrode block in the second row and a fourth column, Tx1_11 represents a touch electrode block in the second row and a fifth column, and Tx1_12 represents a touch electrode block in the second row and a sixth column. A first touch region Tx1 includes the touch electrode blocks in the first row and the second row.

Tx2__1 represents a touch electrode block in a third row and the first column, Tx2__2 represents a touch electrode block in the third row and the second column, Tx2__3 represents a touch electrode block in the third row and the third column, Tx2__4 represents a touch electrode block in the third row and the fourth column, Tx2__5 represents a touch electrode block in the third row and the fifth column, Tx2__6 represents a touch electrode block in the third row and the sixth column, Tx2__7 represents a touch electrode block in a four row and the first column, Tx2__8 represents a touch electrode block in the four row and the second column, Tx2__9 represents a touch electrode block in the four row and the third column, Tx2_10 represents a touch electrode block in the four row and the fourth column, Tx2_11 represents a touch electrode block in the four row and the fifth column, and Tx2_12 represents a touch electrode block in the four row and the sixth column. A second touch region Tx2 includes the touch electrode blocks in the third row and the fourth row.

Txn_1 represents a touch electrode block in a $(2n-1)^{th}$ row and the first column, Txn_2 represents a touch electrode block in the $(2n-1)^{th}$ row and the second column, Txn_3 represents a touch electrode block in the $(2n-1)^{th}$ row and the third column, Txn_4 represents a touch electrode block in the $(2n-1)^{th}$ row and the fourth column, Txn_5 represents a touch electrode block in the $(2n-1)^{th}$ row and the fifth column, Txn_6 represents a touch electrode block in the $(2n-1)^{th}$ row and the sixth column, Txn_7 represents a touch electrode block in a $(2n)^{th}$ row and the first column, Txn_8 represents a touch electrode block in the $(2n)^{th}$ row and the second column, Txn_9 represents a touch electrode block in the $(2n)^{th}$ row and the third column, Txn_10 represents a touch electrode block in the $(2n)^{th}$ row and the fourth column, Txn_11 represents a touch electrode block in the $(2n)^{th}$ row and the fifth column, and Txn_12 represents a touch electrode block in the $(2n)^{th}$ row and sixth third column. An $n^{th}$ touch region Txn includes the touch electrode blocks in the $(2n-1)^{th}$ row and the $(2n)^{th}$ row.

In FIG. 8, a reference sign 51 represents the driving IC.

When the touch electrode blocks in FIG. 8 are to be scanned, they may be scanned in a region-based manner at first. When there is the touch region which is being touched, this touch region may be scanned again so as to determine coordinates of the touch position, and when there is no touch region which is being touched, no further scanning operation may be performed. In this way, it is able to reduce the touch time and improve the touch scanning efficiency. In addition, when there is the touch region which is being touched and a touch point is located at a distal region to a driving IC, the touch time may be relatively long due to signal delay. When the touch point is located at a proximal region to the driving IC (i.e., in the Tx1 or Tx2), the touch time may be reduced. As compared with a conventional touch scanning mode where a time desired for scanning the distal region to the driving IC is taken as the touch scanning time, it is able to further reduce the touch scanning time and improve the touch scanning efficiency.

The present disclosure further provides in some embodiments a method for driving the above-mentioned touch module, including: determining, by the touch region determination unit, whether each touch region is being touched, and when there is the touch region which is being touched, applying a detection control signal to the touch position detection unit; and detecting, by the touch position detection unit upon the receipt of the detection control signal, a position of the touch electrode block which is being touched in the touch region which is being touched.

According to the method in the embodiments of the present disclosure, the touch region may be determined by the touch region determination unit approximately, and then a touch scanning operation may be performed by the touch position detection unit merely on the touch region which is being touched. As a result, it is able to reduce a touch time.

To be specific, the touch region determination unit may include a first switching module, N number of primary touch detection ends corresponding to the N number of touch regions respectively, and a touch region determination module. The determining, by the touch region determination unit, whether each touch region is being touched, and when there is the touch region which is being touched, applying the detection control signal to the touch position detection unit includes: at a first touch stage, controlling, by the first switching module, each primary touch detection end to be electrically connected to all the touch electrode blocks in a corresponding touch region under the control of a first control line; and applying, by the touch region determination module, a touch scanning signal to each primary touch detection end, determining whether a corresponding touch region is being touched in accordance with a touch sensing signal from the primary touch detection end, and when there is the touch region which is being touched, transmitting the detection control signal to the touch position detection unit.

To be specific, the touch position detection unit may include a detection control module connected to the touch region determination module, a second switching module, a plurality of secondary touch detection ends corresponding to the plurality of touch electrode blocks respectively, and a touch position detection module. The detecting, by the touch position detection unit upon the receipt of the detection control signal, the position of the touch electrode block which is being touched in the touch region which is being touched includes: at a second touch stage, applying, by the detection control module upon the receipt of the detection control signal, an on-state control signal to the second control line; controlling, by the second switching module, each touch electrode block to be electrically connected to a corresponding secondary touch detection end under the control of the on-state control signal applied to the second control line; and applying, by the touch position detection module, the touch scanning signal to the secondary touch detection end corresponding to each touch electrode block in the touch region which is being touched, and determining the position of the touch electrode block which is being touched in accordance with the touch sensing signal from the secondary touch detection end corresponding to the touch electrode block in the touch region which is being touched.

During the implementation, the method may further include, at the second touch stage, controlling, by the touch position detection module, the secondary touch detection ends corresponding to the touch electrode blocks in the touch regions which are not being touched to be in a floating state or to be grounded, or applying a common electrode voltage to the secondary touch detection ends corresponding to the touch electrode blocks in the touch regions which are not being touched, so as to prevent the touch operation from being adversely affected.

To be specific, the touch electrode layer may be a common electrode layer, and the touch module may further include a common electrode voltage application unit. The method further includes: applying, by the common electrode voltage application unit, the common electrode voltage to the N number of primary touch detection ends at a display stage; controlling, by the first switching module, each primary touch detection end to be electrically connected to all the touch electrode blocks in the corresponding touch region under the control of the first control line; and controlling, by the second switching module, each touch electrode block to be electrically disconnected from the corresponding secondary touch detection end under the control of the second control line.

The present disclosure further provides in some embodiments a display device including the above-mentioned touch module. For example, the display device may include a display substrate, and the first switching module and the second switching module of the touch module may be arranged at a fan-out region of the display substrate.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch module, comprising a touch electrode layer, a touch region determination unit and a touch position detection unit, wherein the touch electrode layer comprises a plurality of touch electrode blocks arranged in an array form and independent of each other, and the plurality of touch electrode blocks is divided into N number of touch regions, where N is an integer greater than 1;

the touch region determination unit is configured to determine whether each touch region is being touched, and when there is a touch region which is being touched, transmit a detection control signal to the touch position detection unit; and the touch position detection unit is configured to, upon the receipt of the detection control signal, detect a position of a corresponding touch electrode block which is being touched in the touch region which is being touched, wherein the touch region determination unit comprises a first switching module, N number of primary touch detection ends corresponding to the N number of touch regions respectively, and a touch region determination module;

the first switching module is connected to a first control line, the plurality of touch electrode blocks and the N number of primary touch detection ends, and configured to, at a first touch stage, control each primary touch detection end to be electrically connected to all the touch electrode blocks in a corresponding touch region under the control of the first control line; and the touch region determination module is connected to the N number of primary touch detection ends, and configured to, at the first touch stage, apply a touch scanning signal to each primary touch detection end, determine whether a corresponding touch region is being touched in accordance with a touch sensing signal from the primary touch detection end, and when there is the touch region which is being touched, transmit the detection control signal to the touch position detection unit.

2. The touch module according to claim 1, wherein the touch position detection unit comprises a detection control module, a second switching module, a plurality of secondary touch detection ends corresponding to the plurality of touch electrode blocks respectively, and a touch position detection module;

the detection control module is connected to the touch region determination module, and configured to, upon the receipt of the detection control signal, apply an on-state control signal to a second control line;

the second switching module is connected to the second control line, the plurality of touch electrode blocks and the plurality of secondary touch detection ends, and configured to, at a second touch stage, control each touch electrode block to be electrically connected to a corresponding secondary touch detection end under the control of the on-state control signal applied to the second control line; and the touch position detection module is connected to the plurality of secondary touch detection ends, and configured to, at the second touch stage, apply the touch scanning signal to the secondary touch detection end corresponding to each touch electrode block in the touch region which is being touched, and determine the position of the touch electrode block which is being touched in accordance with the touch sensing signal from the secondary touch detection end corresponding to the touch electrode block in the touch region which is being touched.

3. The touch module according to claim 2, wherein the first switching module is further configured to, at the second touch stage, control each primary touch detection end to be electrically disconnected from all the touch electrode blocks in the corresponding touch region under the control of the first control line;

the second switching module is further configured to, at the first touch stage, control each touch electrode block to be electrically disconnected from the corresponding secondary touch detection end under the control of the second control line; and the touch position detection module is further configured to, at the second touch stage, control the secondary touch detection ends corresponding to the touch electrode blocks in the touch regions which are not being touched to be in a floating state or to be grounded, or apply a common electrode voltage to the secondary touch detection ends corresponding to the touch electrode blocks in the touch regions which are not being touched.

4. The touch module according to claim 2, wherein the second switching module comprises N number of detection switching sub-modules, and an $n^{th}$ detection switching sub-module corresponds to the $n^{th}$ touch region; and the $n^{th}$ detection switching sub-module is connected to the second control line, all the touch electrode blocks in the $n^{th}$ touch region, and the secondary touch detection ends corresponding to the touch electrode blocks, and configured to control each touch electrode block in the $n^{th}$ touch region to be electrically connected to, or electrically disconnected from, the secondary touch detection end corresponding to the touch electrode block under the control of the second control line.

5. The touch module according to claim 4, wherein the $n^{th}$ detection switching sub-module comprises M number of secondary switching transistors, and each secondary switching transistor corresponds to one of the touch electrode blocks in the $n^{th}$ touch region; and a gate electrode of each secondary switching transistor is connected to the second control line, a first electrode of the secondary switching transistor is connected to the corresponding touch electrode block, and a second electrode of the secondary switching transistor is connected to the secondary touch detection end corresponding to the touch electrode block.

6. The touch module according to claim 4, wherein the N number of detection switching sub-modules are arranged at the fan-out region of the display substrate.

7. The touch module according to claim 2, wherein the touch electrode layer is a common electrode layer, and the touch module further comprises a common electrode voltage application unit connected to the N number of primary touch detection ends and configured to apply a common electrode voltage to the N number of primary touch detection ends at a display stage;

the first switching module is further configured to control each primary touch detection end to be electrically connected to all the touch electrode blocks in the corresponding touch region under the control of the first control line; and the second switching module is further configured to control each touch electrode block to be electrically disconnected from the corresponding secondary touch detection end under the control of the second control line.

8. The touch module according to claim 7, wherein the common electrode layer is multiplexed as the touch electrode layer.

9. The touch module according to claim 1, wherein the first switching module comprises N number of determination switching sub-modules;

an $n^{th}$ determination switching sub-module of the N number of determination switching sub-modules corresponds to an $n^{th}$ touch region of the N number of touch regions;

M number of touch electrode blocks are arranged in the $n^{th}$ touch region, where M is a positive integer, and n is a positive integer smaller than or equal to N; and the n<sup>th</sup> determination switching sub-module is connected to the first control line, all the touch electrode blocks in the n<sup>th</sup> touch region and an n<sup>th</sup> primary touch detection end of the N number of primary touch detection ends, and configured to control all the touch electrode blocks in the n<sup>th</sup> touch region to be electrically connected to, or electrically disconnected from, the n<sup>th</sup> primary touch detection end under the control of the first control line.

10. The touch module according to claim 9, wherein the n<sup>th</sup> determination switching sub-module comprises M number of primary switching transistors, and each primary switching transistor corresponds to one of the touch electrode blocks in the n<sup>th</sup> touch region; and
   a gate electrode of each primary switching transistor is connected to the first control line, a first electrode of the primary switching transistor is connected to the corresponding touch electrode block, and a second electrode of the primary switching transistor is connected to the n<sup>th</sup> primary touch detection end.

11. The touch module according to claim 9, wherein the N number of determination switching sub-modules are arranged at a fan-out region of a display substrate.

12. The touch module according to claim 1, wherein the number of the touch electrode blocks in each touch region is same.

13. The touch module according to claim 1, wherein the number of the touch electrode blocks in each touch region is different.

14. A method for driving the touch module according to claim 1, comprising:
   determining, by the touch region determination unit, whether each touch region is being touched, and when there is the touch region which is being touched, applying a detection control signal to the touch position detection unit; and
   detecting, by the touch position detection unit upon the receipt of the detection control signal, a position of the touch electrode block which is being touched in the touch region which is being touched.

15. The method according to claim 14, wherein the touch region determination unit comprises a first switching module, N number of primary touch detection ends corresponding to the N number of touch regions respectively, and a touch region determination module, and
   the determining, by the touch region determination unit, whether each touch region is being touched, and when there is the touch region which is being touched, applying the detection control signal to the touch position detection unit comprises:
   at a first touch stage, controlling, by the first switching module, each primary touch detection end to be electrically connected to all the touch electrode blocks in a corresponding touch region under the control of a first control line; and
   applying, by the touch region determination module, a touch scanning signal to each primary touch detection end, determining whether a corresponding touch region is being touched in accordance with a touch sensing signal from the primary touch detection end, and when there is the touch region which is being touched, transmitting the detection control signal to the touch position detection unit.

16. The method according to claim 15, wherein the touch position detection unit comprises a detection control module connected to the touch region determination module, a second switching module, a plurality of secondary touch detection ends corresponding to the plurality of touch electrode blocks respectively, and a touch position detection module,
   the detecting, by the touch position detection unit upon the receipt of the detection control signal, the position of the touch electrode block which is being touched in the touch region which is being touched comprises:
   at a second touch stage, applying, by the detection control module upon the receipt of the detection control signal, an on-state control signal to the second control line;
   controlling, by the second switching module, each touch electrode block to be electrically connected to a corresponding secondary touch detection end under the control of the on-state control signal applied to the second control line; and
   applying, by the touch position detection module, the touch scanning signal to the secondary touch detection end corresponding to each touch electrode block in the touch region which is being touched, and determining the position of the touch electrode block which is being touched in accordance with the touch sensing signal from the secondary touch detection end corresponding to the touch electrode block in the touch region which is being touched.

17. The method according to claim 16, further comprising, at the second touch stage, controlling, by the touch position detection module, the secondary touch detection ends corresponding to the touch electrode blocks in the touch regions which are not being touched to be in a floating state or to be grounded, or applying a common electrode voltage to the secondary touch detection ends corresponding to the touch electrode blocks in the touch regions which are not being touched.

18. The method according to claim 16, wherein the touch electrode layer is a common electrode layer, and the touch module further comprises a common electrode voltage application unit, and
   the method further comprises:
   applying, by the common electrode voltage application unit, the common electrode voltage to the N number of primary touch detection ends at a display stage;
   controlling, by the first switching module, each primary touch detection end to be electrically connected to all the touch electrode blocks in the corresponding touch region under the control of the first control line; and
   controlling, by the second switching module, each touch electrode block to be electrically disconnected from the corresponding secondary touch detection end under the control of the second control line.

19. A display device, comprising the touch module according to claim 1.

* * * * *